(12) United States Patent
Harvey et al.

(10) Patent No.: US 10,322,688 B2
(45) Date of Patent: Jun. 18, 2019

(54) CONTROLLING ELECTRICAL ACCESS TO A LITHIUM BATTERY ON A UTILITY VEHICLE

(71) Applicant: Textron Innovations Inc., Providence, RI (US)

(72) Inventors: Arthur James Harvey, Beech Island, SC (US); Norman R. Padgett, Evans, GA (US); John Ledden, Augusta, GA (US); Robert Charles Bradley, Augusta, GA (US); Patrick Dwaine Warden, Grovetown, GA (US)

(73) Assignee: Textron Innovations Inc., Providence, RI (US)

( * ) Notice: Subject to any disclaimer, the term of this patent is extended or adjusted under 35 U.S.C. 154(b) by 176 days.

(21) Appl. No.: 15/395,245

(22) Filed: Dec. 30, 2016

(65) Prior Publication Data

US 2018/0186316 A1    Jul. 5, 2018

(51) Int. Cl.
*B60L 11/00*   (2006.01)
*B60R 16/033*  (2006.01)
(Continued)

(52) U.S. Cl.
CPC .............. *B60R 16/033* (2013.01); *B60L 1/00* (2013.01); *B60L 7/12* (2013.01); *B60L 11/1809* (2013.01);
(Continued)

(58) Field of Classification Search
CPC ............ B60R 16/033; B60L 7/12; B60L 1/00; B60L 11/1851; B60L 11/1809;
(Continued)

(56) References Cited

U.S. PATENT DOCUMENTS 3,767,966 A * 10/1973 Bell ........................ B60Q 1/143
                                                    315/83
5,332,958 A *  7/1994 Sloan ....................... H02J 1/14
                                                    307/10.7
(Continued)

FOREIGN PATENT DOCUMENTS

EP           3107178         12/2016

OTHER PUBLICATIONS

Garia, "Introducing the New Garia Golf", http://www.garia.com/news/introducing-the-new-garia-golf/, Sep. 15, 2016.

*Primary Examiner* — Khoi H Tran
*Assistant Examiner* — Jorge O Peche
(74) *Attorney, Agent, or Firm* — BainwoodHuang

(57) ABSTRACT

A battery management system (BMS) controls lithium battery access on a utility vehicle. The BMS includes a battery interface that couples with a lithium battery, a load interface that couples with a set of loads of the utility vehicle, and control circuitry coupled with the battery interface and the load interface. The control circuitry mechanically disconnects the battery interface from the load interface in response to a sleep event. Additionally, after the battery interface is mechanically disconnected from the load interface, the control circuitry mechanically reconnects the battery interface to the load interface in response to a wakeup event. Furthermore, after the battery interface is mechanically reconnected to the load interface, the control circuitry maintains connection between the battery interface and the load interface to convey power from the lithium battery to the set of loads of the utility vehicle through the battery interface and the load interface.

20 Claims, 8 Drawing Sheets

(51) Int. Cl.
  *B60L 1/00* (2006.01)
  *B60L 11/18* (2006.01)
  *B60L 7/12* (2006.01)
  *H02J 7/00* (2006.01)
  *H02P 1/02* (2006.01)
  *H02P 3/06* (2006.01)
  *H02J 9/00* (2006.01)

(52) U.S. Cl.
  CPC ......... *B60L 11/1851* (2013.01); *H02J 7/0063* (2013.01); *H02P 1/022* (2013.01); *H02P 3/06* (2013.01); *B60L 2240/80* (2013.01); *B60L 2250/26* (2013.01); *H02J 9/005* (2013.01); *H02J 2007/0067* (2013.01); *Y02T 10/705* (2013.01); *Y02T 10/7011* (2013.01); *Y02T 10/7072* (2013.01); *Y02T 10/7258* (2013.01); *Y02T 10/92* (2013.01); *Y02T 90/14* (2013.01)

(58) Field of Classification Search
  CPC .... B60L 2240/80; B60L 2250/26; H02P 3/06; H02P 1/022; H02J 7/0063; H02J 9/005; H02J 2007/0067
  See application file for complete search history.

(56) References Cited

U.S. PATENT DOCUMENTS

| | | | | |
|---|---|---|---|---|
| 5,934,051 A * | 8/1999 | Hahn | .................... | B60K 28/04 180/273 |
| 5,936,317 A * | 8/1999 | Sasanouchi | .......... | H02J 7/0031 307/10.1 |
| 6,625,553 B1 * | 9/2003 | Modgil | .................. | B60R 25/04 307/10.7 |
| 7,332,881 B2 * | 2/2008 | Clark | ..................... | B60L 3/108 318/139 |
| 7,560,882 B2 | 7/2009 | Clark et al. | | |
| 7,800,345 B2 * | 9/2010 | Yun | .................... | H01M 10/486 320/132 |
| 7,825,616 B2 | 11/2010 | Clark et al. | | |
| D652,349 S * | 1/2012 | Kristensen | .................... | D12/16 |
| 8,120,291 B2 | 2/2012 | Clark et al. | | |
| 8,596,391 B2 * | 12/2013 | Kshatriya | ................ | B60K 1/00 180/65.22 |
| 8,604,749 B2 * | 12/2013 | Kwag | ..................... | H01M 10/482 320/106 |
| 8,714,572 B1 * | 5/2014 | Singletary | ................ | B60G 9/00 280/124.113 |
| 9,050,899 B2 * | 6/2015 | Seol | .................... | B60L 11/1805 |
| 9,371,067 B2 * | 6/2016 | Dao | ........................ | H04Q 9/00 |
| 9,387,775 B2 * | 7/2016 | Baek | .................. | B60L 15/2045 |
| 9,436,261 B2 * | 9/2016 | Yun | ........................ | G06F 1/3212 |
| 9,508,982 B2 * | 11/2016 | Kim | ....................... | H01M 4/133 |
| 9,553,460 B2 * | 1/2017 | Dao | ........................ | H02J 7/0013 |
| 9,592,743 B2 * | 3/2017 | Haug | ..................... | B60L 11/1851 |
| 9,595,847 B2 * | 3/2017 | Dao | ........................ | H02J 9/061 |
| 9,806,341 B2 * | 10/2017 | Lee | ........................ | H01M 4/525 |
| 9,806,545 B2 * | 10/2017 | Fink | ........................ | H01M 2/347 |
| 10,046,652 B1 * | 8/2018 | Yoshida | .............. | B60L 11/1809 |
| 2002/0111756 A1 * | 8/2002 | Modgil | .................. | B60R 25/04 702/63 |
| 2005/0023072 A1 * | 2/2005 | Kodama | ................ | B62D 5/008 180/402 |
| 2009/0125184 A1 * | 5/2009 | Oakes | ................. | H01M 10/441 701/36 |
| 2010/0201293 A1 * | 8/2010 | Yoshida | ................ | B60K 6/445 318/139 |
| 2010/0297482 A1 * | 11/2010 | Yoon | ....................... | H01M 2/34 429/61 |
| 2012/0013304 A1 * | 1/2012 | Murase | ............... | B60L 11/1864 320/116 |
| 2012/0176082 A1 * | 7/2012 | Lee | ........................... | B60L 1/02 320/103 |
| 2013/0241502 A1 * | 9/2013 | Sowden | ................ | H02J 7/0029 322/28 |
| 2014/0225621 A1 * | 8/2014 | Kimura | ................ | G01R 31/367 324/426 |
| 2015/0318723 A1 * | 11/2015 | Brockman | ........ | H01M 10/4257 307/117 |
| 2016/0094056 A1 * | 3/2016 | Dulle | ...................... | H02J 7/007 320/126 |
| 2017/0104353 A1 * | 4/2017 | Zhao | ..................... | H02J 7/0063 |
| 2017/0182893 A1 * | 6/2017 | Hayashizaki | ............ | B60L 3/00 |
| 2018/0047219 A1 * | 2/2018 | Buswell | ..................... | G07C 5/008 |
| 2018/0186241 A1 * | 7/2018 | Harvey | ..................... | B60L 3/04 |
| 2018/0186244 A1 * | 7/2018 | Harvey | ..................... | B60L 3/04 |
| 2018/0186355 A1 * | 7/2018 | Harvey | ..................... | B60T 1/062 |

\* cited by examiner

CONTROLLING ELECTRICAL ACCESS TO A LITHIUM BATTERY ON A UTILITY VEHICLE

BACKGROUND

Some conventional electric vehicles run on power from lead acid batteries. For these vehicles, operators are able to continue using the vehicles as long as there is sufficient charge available from the lead acid batteries.

To recharge the lead acid batteries of these vehicles, the operators simply connect the lead acid batteries to an external power source (e.g., street power). Once the lead acid batteries have been recharged, the operators are able to return to using the vehicles.

SUMMARY

It should be understood that there are deficiencies to the above-described conventional electric vehicles which run on power from lead acid batteries. Along these lines, lead acid batteries are inferior to lithium batteries from certain perspectives. For example, lead acid batteries tend to weigh more, have shorter cycle life, and provide less consistent voltage, among other things.

Unfortunately, it would be unsafe to simply substitute lithium batteries in place of lead acid batteries. For example, if one were to simply replace a lead acid battery with a lithium battery in an electric vehicle, it may be possible to deeply discharge and then recharge the lithium battery. However, recharging a lithium battery that has been over-discharged may make the lithium battery unstable and thus susceptible to a hazardous event.

Improved techniques are directed to electronically controlling electrical access to lithium batteries on utility vehicles. Such techniques provide the ability to automatically disconnect the lithium batteries from loads in response to certain situations such as fault conditions, timeouts, and sleep events. Such operation prevents the lithium batteries from discharging even due to parasitic loads while the utility vehicles are idle. As a result, such operation robustly and reliably prevents the lithium batteries from being recharged after being over-discharged and thus safeguards the lithium batteries against becoming unstable.

One embodiment is directed to a battery management system that controls lithium battery access on a utility vehicle. The battery management system includes a lithium battery interface configured to couple to a lithium battery, a power delivery interface configured to couple to a set of loads of the utility vehicle, and control circuitry coupled with the lithium battery interface and the power delivery interface. The control circuitry is configured to mechanically disconnect the lithium battery interface from the power delivery interface in response to a sleep event. The control circuitry is further configured to, after the lithium battery interface is mechanically disconnected from the power delivery interface, mechanically reconnect the lithium battery interface to the power delivery interface in response to a wakeup event. The control circuitry is configured to, after the lithium battery interface is mechanically reconnected to the power delivery interface, maintain connection between the lithium battery interface and the power delivery interface to convey power from the lithium battery to the set of loads of the utility vehicle through the lithium battery interface and the power delivery interface.

In some arrangements, the control circuitry includes a contactor having source contacts configured to couple to the lithium battery interface, target contacts configured to couple to the power delivery interface, and an electromagnetic actuator, and a wakeup circuit coupled with the electromagnetic actuator of the contactor. The wakeup circuit is configured to (i) actuate the electromagnetic actuator to a first position that connects the source contacts to the target contacts in response to the wakeup event, and (ii) release the electromagnetic actuator to a second position that disconnects the source contacts from the target contacts in response to the sleep event. The second position is different from the first position.

In some arrangements, the wakeup circuit is further configured to release the electromagnetic actuator to the second position that disconnects the source contacts from the target contacts in response to a low capacity event in which the lithium battery has discharged to a predefined low capacity level.

In some arrangements, the wakeup circuit includes a timer which the wakeup circuit is configured to start in response to the wakeup event. In these arrangements, the wakeup circuit is further configured to (i) output an actuation signal to the electromagnetic actuator of the contactor once the timer starts and before the timer expires and (ii) terminate output of the actuation signal to the electromagnetic actuator of the contactor in response to expiration of the timer, the electromagnetic actuator being spring biased from the first position toward the second position to separate the source contacts from the target contacts in response to the wakeup circuit terminating output of the actuation signal.

Another embodiment is directed to a utility vehicle which includes a utility vehicle body, a lithium battery supported by the utility vehicle body, a motor supported by the utility vehicle body, a motor controller coupled with the motor, and a battery management system configured to control lithium battery access on the utility vehicle. The battery management system includes: (i) a lithium battery interface that couples with the lithium battery, (ii) a power delivery interface that couples with the motor controller, and (iii) control circuitry coupled with the lithium battery interface and the power delivery interface. The control circuitry is constructed and arranged to:

(A) mechanically disconnect the lithium battery interface from the power delivery interface in response to a sleep event, (B) after the lithium battery interface is mechanically disconnected from the power delivery interface, mechanically reconnect the lithium battery interface to the power delivery interface in response to a wakeup event, and (C) after the lithium battery interface is mechanically reconnected to the power delivery interface, maintain connection between the lithium battery interface and the power delivery interface to convey power from the lithium battery to the motor controller through the lithium battery interface and the power delivery interface.

Yet another embodiment is directed to a method of controlling lithium battery access in a utility vehicle. The method includes:

(A) mechanically disconnecting a lithium battery interface from a power delivery interface in response to a sleep event, the lithium battery interface coupling to a lithium battery supported by the utility vehicle, and the power delivery interface coupling to a set of loads of the utility vehicle;

(B) after the lithium battery interface is mechanically disconnected from the power delivery interface, mechanically reconnecting the lithium battery interface to the power delivery interface in response to a wakeup event, and (C) after the lithium battery interface is mechanically reconnected to the power delivery interface, maintaining connection between the lithium battery interface and the power delivery interface to convey power from the lithium battery to the set of loads of the utility vehicle through the lithium battery interface and the power delivery interface.

Yet another embodiment is directed to a computer program product having at least one non-transitory computer readable medium, the at least one non-transitory computer readable medium having stored thereon a set of instructions to control lithium battery access on a utility vehicle. The set of instructions, when carried out by control circuitry, causes the control circuitry to perform a method of:

(A) mechanically disconnecting a lithium battery interface from a power delivery interface in response to a sleep event, the lithium battery interface coupling to a lithium battery supported by the utility vehicle, and the power delivery interface coupling to a set of loads of the utility vehicle;

(B) after the lithium battery interface is mechanically disconnected from the power delivery interface, mechanically reconnecting the lithium battery interface to the power delivery interface in response to a wakeup event, and (C) after the lithium battery interface is mechanically reconnected to the power delivery interface, maintaining connection between the lithium battery interface and the power delivery interface to convey power from the lithium battery to the set of loads of the utility vehicle through the lithium battery interface and the power delivery interface.

Other embodiments are directed to higher and lower level systems, assemblies, apparatus, processing circuits, etc. Some embodiments are directed to various processes, electronic components and circuitry which are involved in controlling electrical access to a lithium battery on a utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to controlling electrical access to a lithium battery on a utility vehicle. Such a technique provides the ability to automatically disconnect the lithium battery from loads in response to timeout (or sleep) events. Such operation prevents the lithium battery from discharging even due to a parasitic load while the utility vehicle is idle. As a result, such operation robustly and reliably prevents the lithium battery from being recharged after being over-discharged (since the lithium battery is never over-discharged) and thus protects the lithium battery against becoming unstable.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
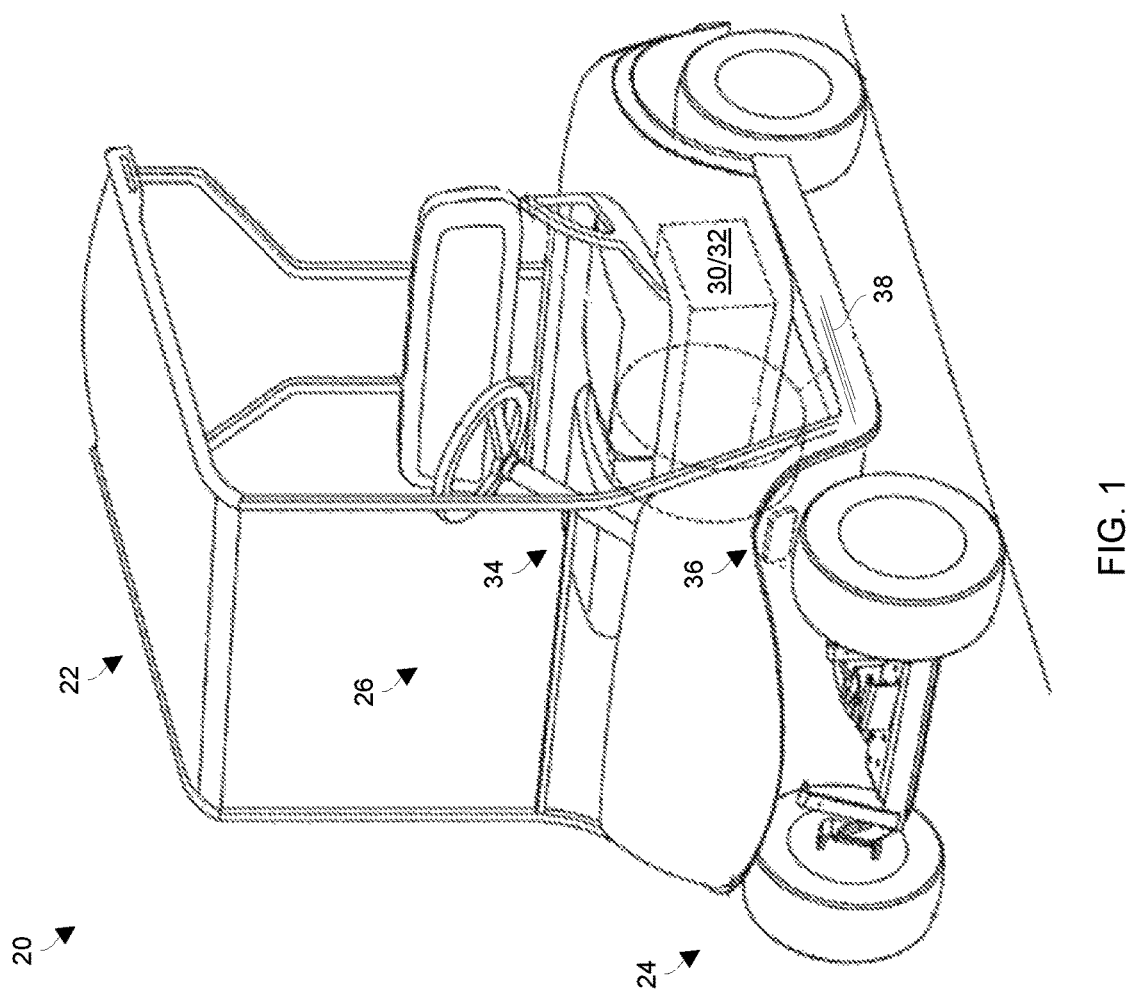
FIG. 1 is a perspective view of an example utility vehicle which controls electrical access to a lithium battery.

FIG. 1 shows an example utility vehicle 20 which controls electrical access to a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a lithium battery system 32, and additional components 34 such as a set of user controls 36 (e.g., a foot pedal, a keyed switch, a maintenance switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging. Further details will now be provided with reference to FIGS. 2 and 3.

Figure 2:
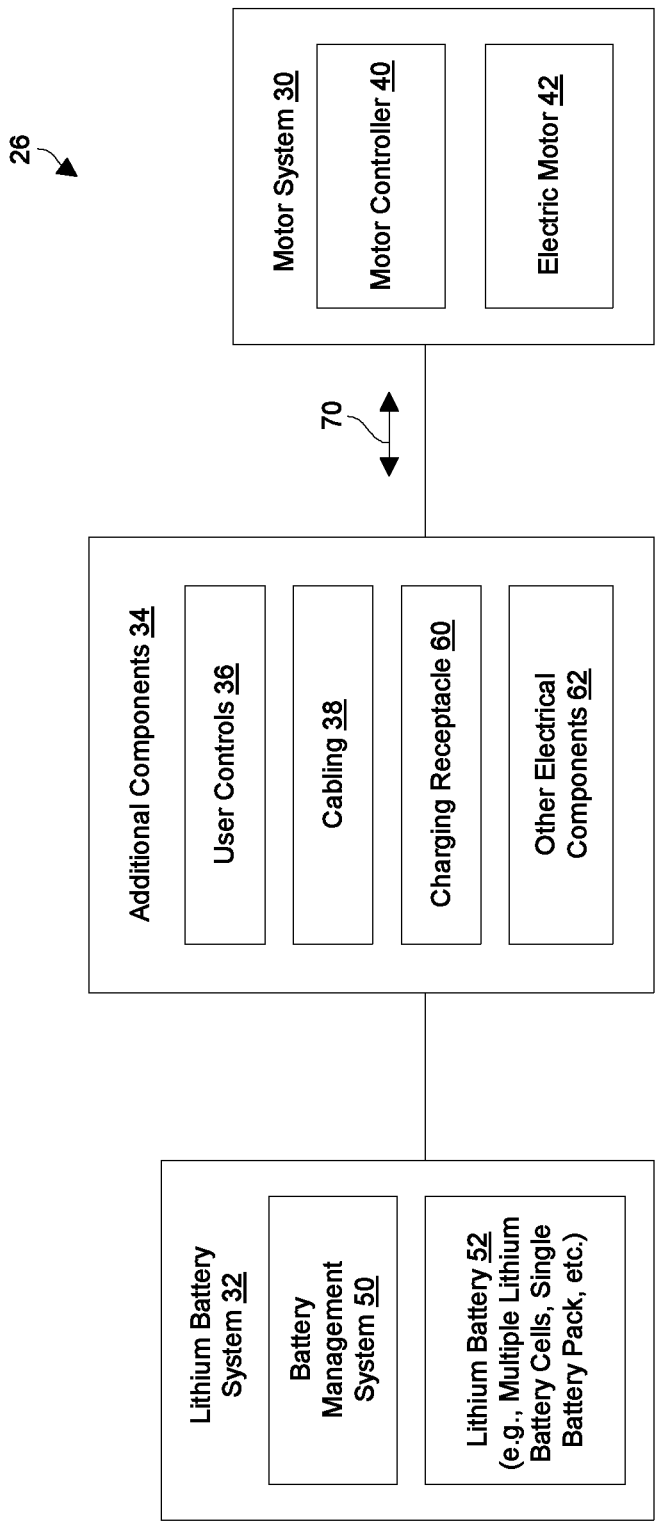
FIG. 2 is a block diagram of particular systems and components of the utility vehicle of FIG. 1 in accordance with some example embodiments.
Figure 3:
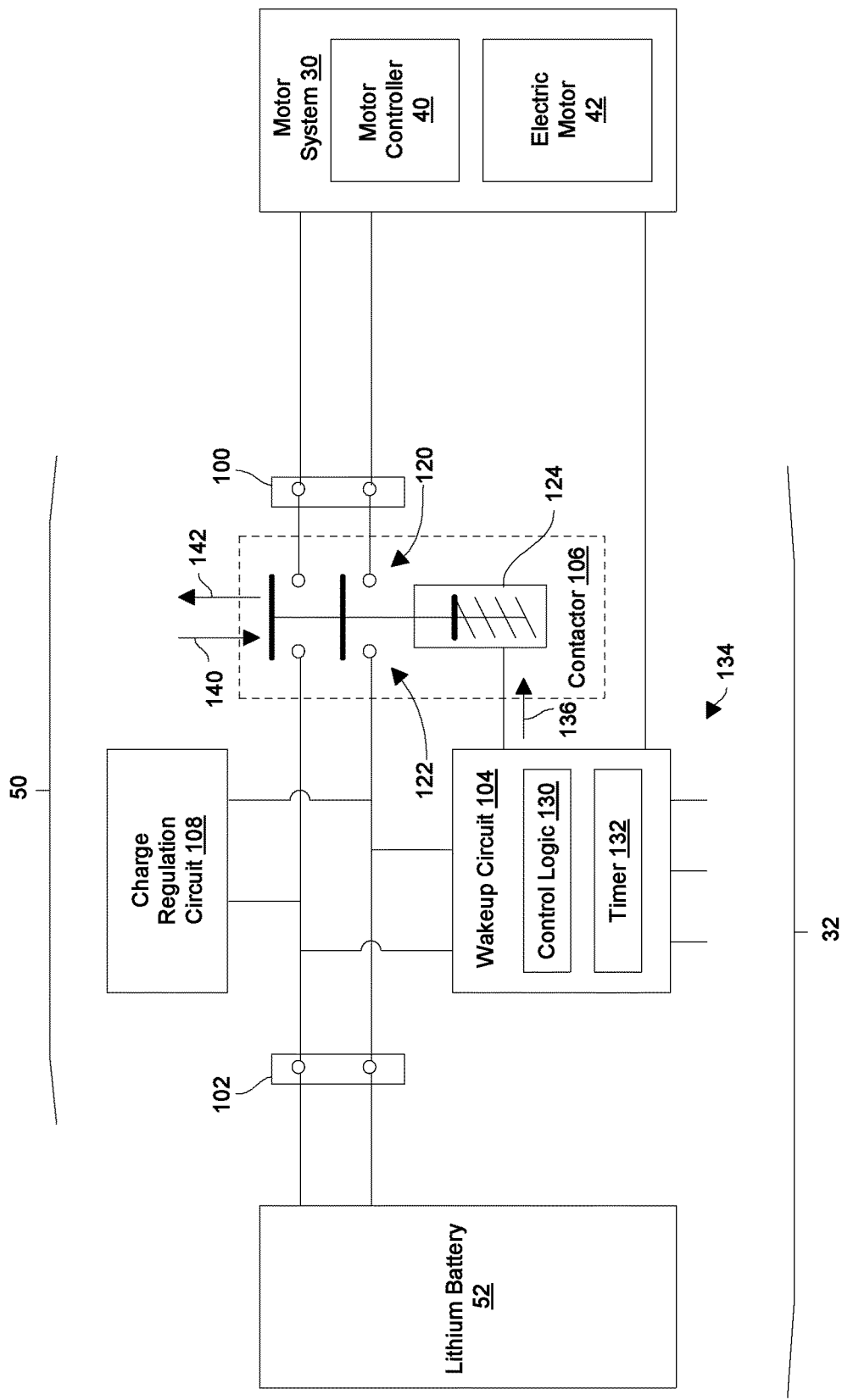
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40 and an electric motor 42. The motor controller 40 controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The lithium battery system 32 includes a battery management system (BMS) 50 and a lithium battery 52. The BMS 50 controls electrical access to the lithium battery 52. Additionally, as will be explained in further detail shortly, the BMS 50 responds to various events such as sleep events (e.g., timeouts) to prevent excessive discharging of the lithium battery 52 thus safeguarding the lithium battery 52 from becoming over discharged. The BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging receptacle 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during discharging and charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
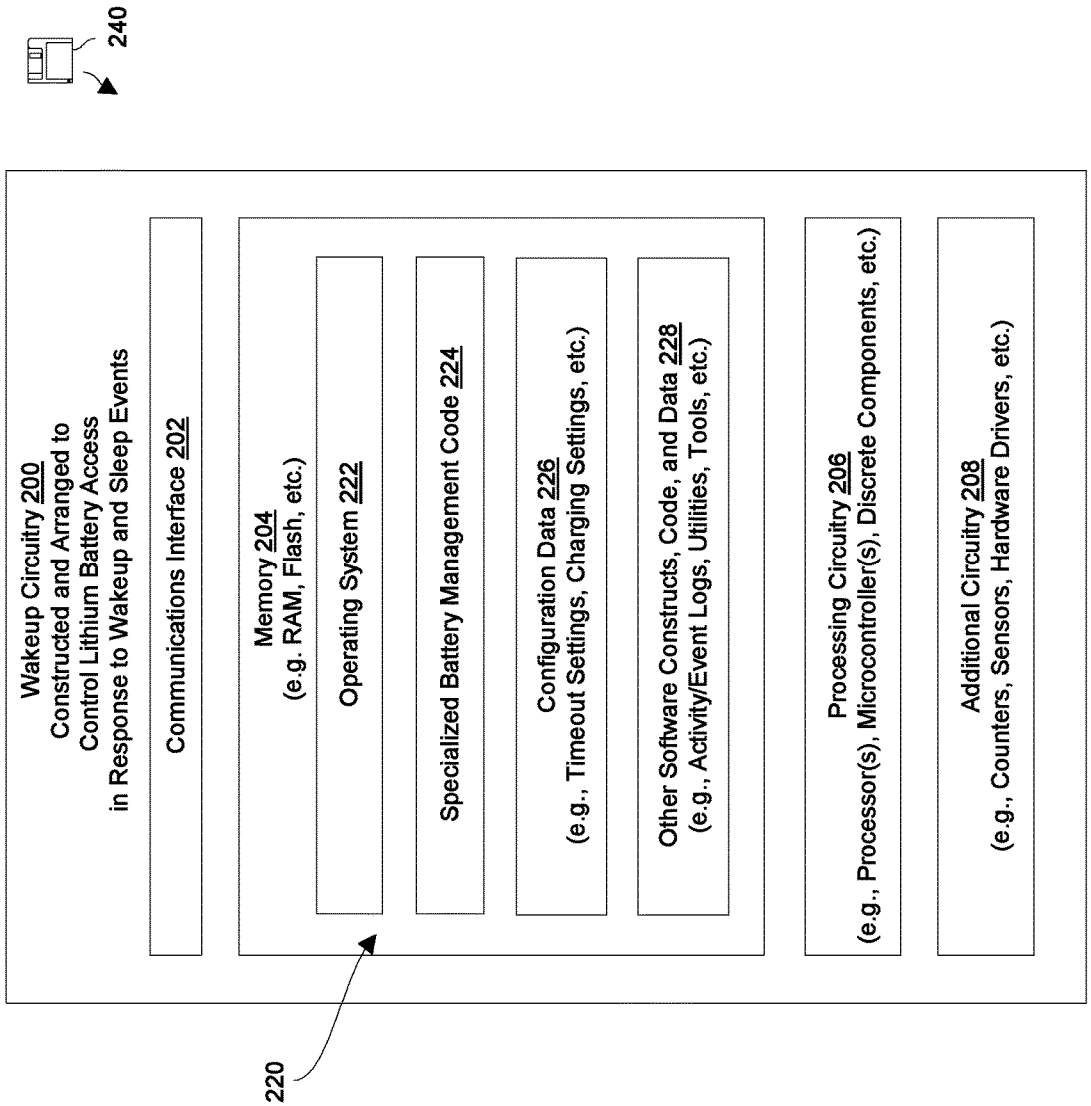
FIG. 4 is a block diagram of particular details of a wakeup circuit of a battery management system of the utility vehicle of FIG. 1 in accordance with some example embodiments.
Figure 5:
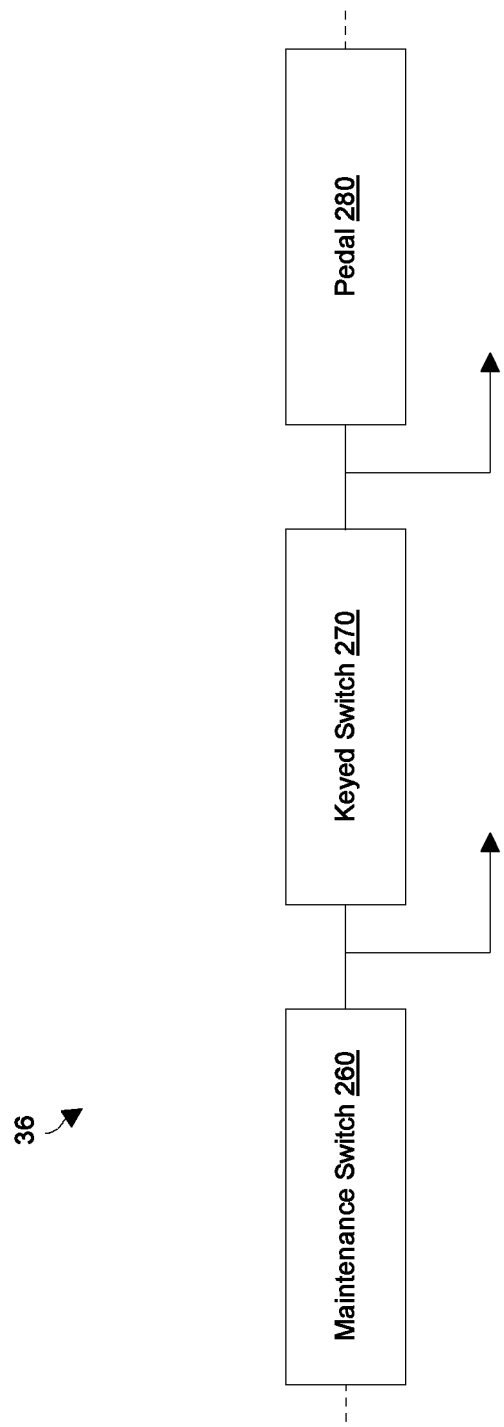
FIG. 5 is a block diagram of a first arrangement of particular user controls that provide input to the wakeup circuit of FIG. 4 in accordance with some example embodiments.
Figure 6:
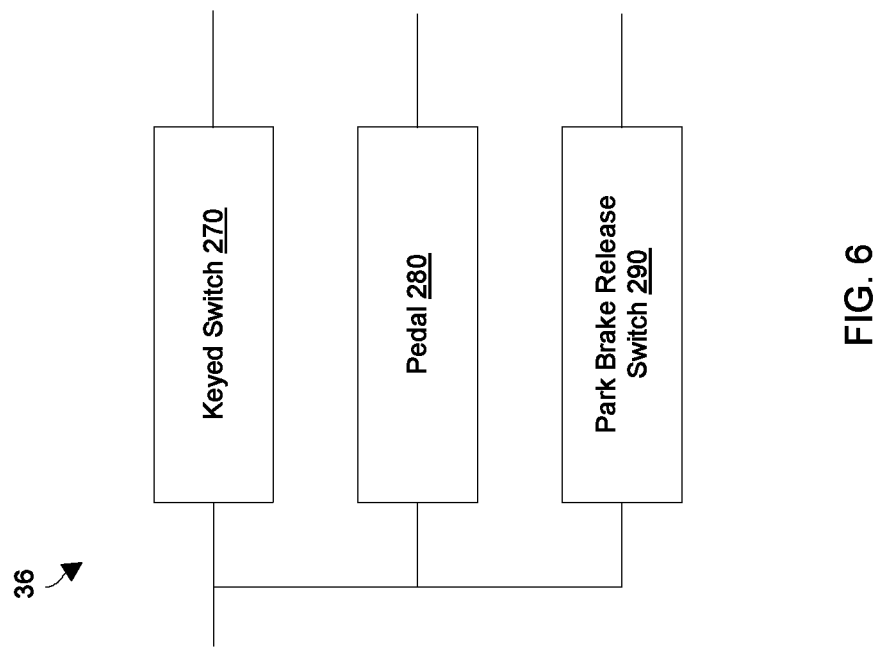
FIG. 6 is a block diagram of a second arrangement of particular user controls that provide input to the wakeup circuit of FIG. 4 in accordance with some example embodiments.

FIGS. 4 through 5 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on.

In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood that the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which directs the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 expires by reaching the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the lithium battery 52 thus improving efficiency.

Charging

Figure 7:
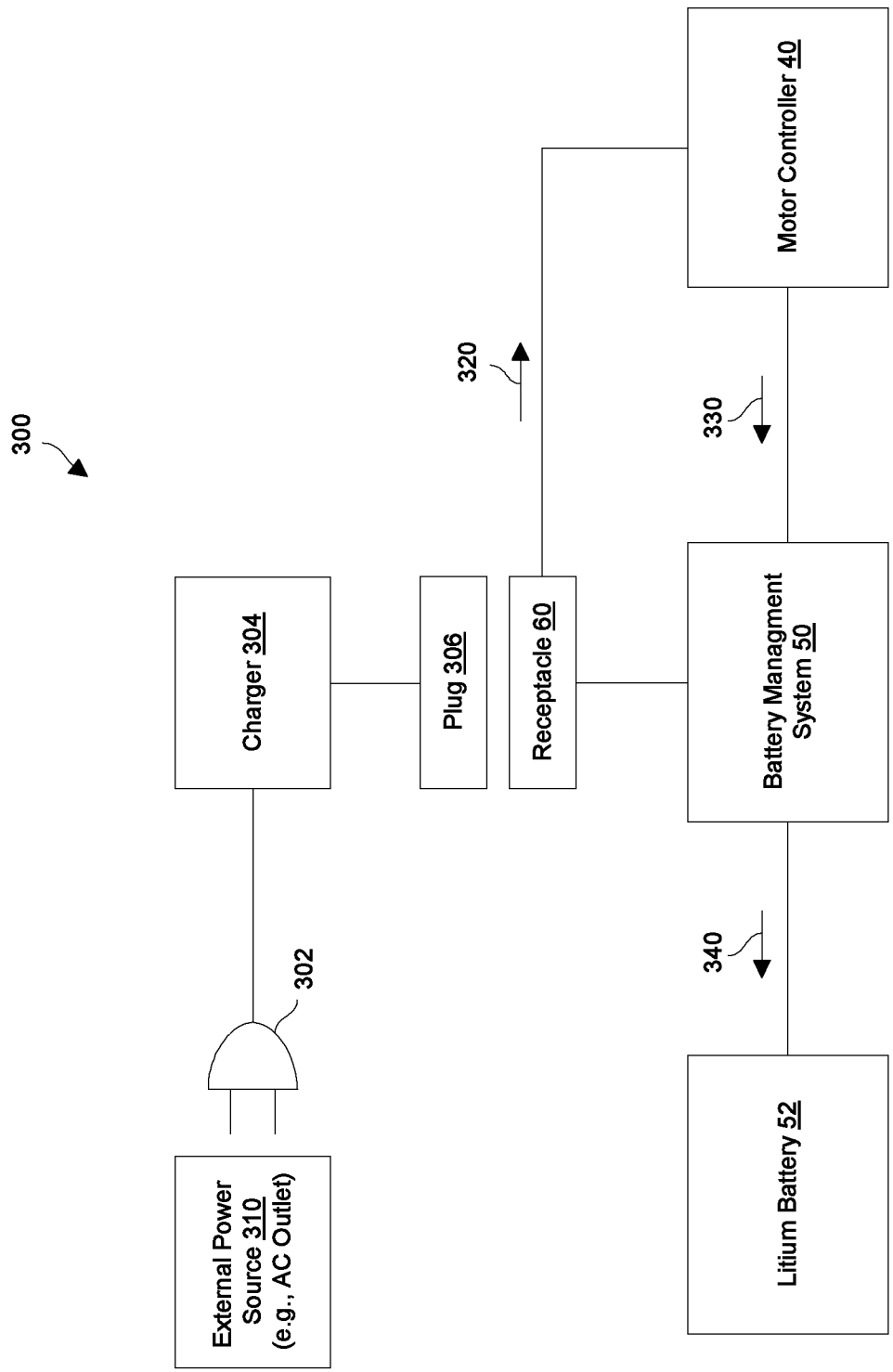
FIG. 7 is a block diagram of particular charging circuitry of the utility vehicle of FIG. 1 in accordance with some example embodiments.

FIG. 7 shows particular details of the charging circuitry 300 which charges the lithium battery 52 of the utility vehicle 20 (also see FIG. 1), in accordance with some example embodiments. In accordance with the embodiments illustrated in FIG. 7, the charging circuitry 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging receptacle 60 of the utility vehicle 20 (also see FIG. 2). The charger 304 is constructed and arranged to convert and condition a power signal from the external power source 310 for use by the utility vehicle 20.

As further shown in FIG. 7, the charging receptacle 60 electrically couples with the motor controller 40 and the battery management system (BMS) 50. Accordingly, when the receptacle 60 receives power from the charging circuitry 300, the receptacle 60 provides power to the motor controller 40 and BMS 50. In some embodiments, this initial power from the charging circuitry 300 wakes up the BMS 50 and the motor controller 40 (FIG. 3). In some embodiments, the receptacle 60 also provides an interlock signal 320 to the motor controller 40 which has also woken up. In response to the interlock signal 320, the motor controller 40 outputs a communication 330 (e.g., a CAN message) that informs the BMS 50 that the charging circuitry 300 is plugged in to the receptacle 60 and the BMS 50 then closes the contactor 106. With the contactor 106 now closed, the BMS 50 conveys a charging signal 340 from the charging circuitry 300 to the lithium battery 52. In some arrangements, the charge regulation circuit 108 (FIG. 3) conditions the charging signal 340 to properly charge the lithium battery 52.

While the lithium battery 52 charges in response to receipt of the charge signal 340 and in accordance with some embodiments, the BMS 50 monitors the lithium battery 52 to prevent overcharging. In particular, in response to sensing that the lithium battery 52 has charged to a predefined maximum charge threshold (or level), the BMS 50 deactivates the charge regulation circuit 108, e.g., sets the duty cycle of pulse width modulation (PWM) circuitry back to 0%, where other pulse widths determine different charging rates. In some arrangements, the BMS 50 then immediately goes to sleep. In other arrangements, the BMS imposes a timeout (e.g., 30 minutes) and goes to sleep if the timeout period expires without further user activity.

Further Details

Figure 8:
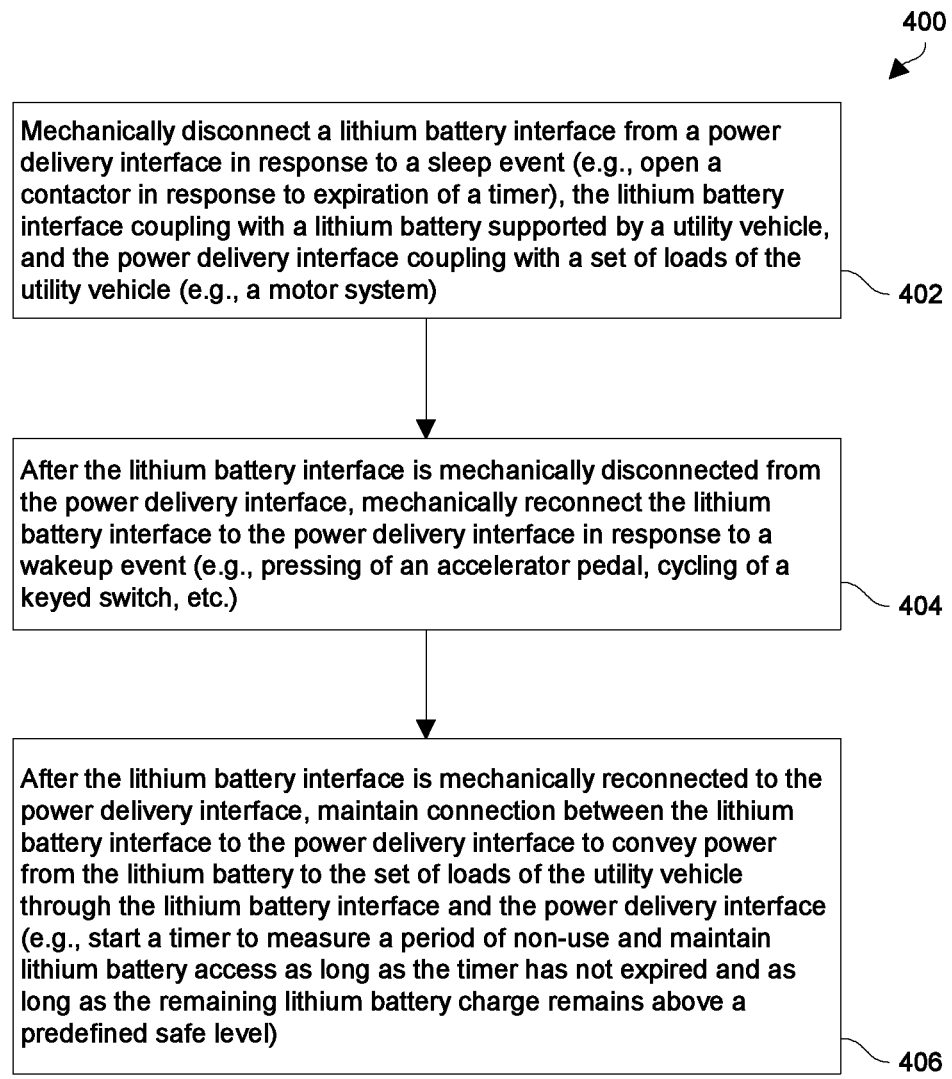
FIG. 8 is a flowchart of a procedure which is performed by the battery management system of the utility vehicle of FIG. 1 in accordance with some example embodiments.

FIG. 8 is a flowchart of a procedure 400 which is performed by the battery management system (BMS) 50 of the utility vehicle 20 to control access to the lithium battery 52 in accordance with some example embodiments.

At 402, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 404, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 406, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

While various embodiments of the present disclosure have been particularly shown and described, it will be understood by those skilled in the art that various changes in form and details may be made therein without departing from the spirit and scope of the present disclosure as defined by the appended claims.

In accordance with some arrangements and as disclosed above, it should be understood that the BMS 50 has the ability to disconnect the lithium battery 52 from loads if unsafe conditions are sensed. The disconnect mechanism is the contactor 106 which consumes energy when engaged. To conserve energy, the BMS 50 disconnects the lithium battery 52 after some timeout period. A wakeup signal is required to reconnect the lithium battery 52 for charging and normal use. That is, the lithium vehicle control system wakeups the BMS 50 to use the utility vehicle 20. Such a wakeup is accomplished without additional operator input.

In some embodiments, the BMS 50 and motor controller 40 routinely communicate (e.g., over the CAN bus). Accordingly, the BMS 50 understands the current status of the motor controller 40 and vice versa. Additionally, as mentioned earlier, the BMS 50 monitors the status of a variety of switch inputs, e.g., a maintenance switch, a keyed switch, a pedal switch, etc.

During operation, the BMS 50 disconnects itself from all electrical loads on the utility vehicle 20 by opening its contactor 106. Events that cause the BMS 50 to close its contactor 106 may be referred to as wakeup events, or simply wakeups. The BMS 50 of some embodiments includes multiple inputs for wakeup signals. Along these lines, users may expect the utility vehicle 20 to go when the key is on and the pedal is pressed—whether the utility vehicle 20 has sat for a long time or not. Accordingly, the maintenance switch, the keyed switch, and the throttle pedal switch are all capable of waking up the BMS 50 of some embodiments.

When the keyed switch is in the OFF position, the motor controller 40 of some embodiments provides a walkaway feature while the BMS 50 remains awake. This walkaway feature prevents the utility vehicle 20, if unattended, from rolling down a slope rapidly. When walkaway protection is active, the motor controller 40 senses vehicle movement and causes the motor 42 to apply braking torque. This walkway protection lasts until the BMS 50 eventually times out (e.g., after 12 hours).

In embodiments including a maintenance switch, the maintenance switch is configured to interrupt power to the motor controller 42 to disable the walkaway feature and enable towing. For example, in some embodiments, the maintenance switch is wired in series with the keyed switch and pedal. Accordingly, the maintenance switch interrupts a wakeup signal to the BMS 50, and interrupts power to the other wakeup switches, thereby preventing the keyed and pedal switches from waking up the BMS 50 while the utility vehicle is in tow mode. Otherwise, cycling the keyed switch wakes up a BMS 50 that was asleep with the maintenance switch closed in the ON position. Likewise, pressing the pedal wakes up a BMS 50 that was asleep with the key in the ON position.

In some embodiments, the same BMS 50 may support operation of different types of motor controllers 40. To this end, the motor controller 40 of some embodiments sends a message (e.g., a CAN message) to the BMS 50 that includes controller type. Upon receipt, the BMS 50 of some embodiments stores the controller type in non-volatile memory. The BMS 50 uses the controller type to determine timeout values, and responses to wakeup signals. The first time the BMS 50 is connected to a different type motor controller 40, the BMS 50 may not wakeup exactly as desired. To minimize the differences between wakeup protocols, wakeup signals may be re-assigned. For example, the BMS' first wakeup signal may be connected to the keyed switch on for a first controller type, and the maintenance switch on a second controller type. Similarly, the second wakeup signal may be connected to the throttle pedal for the first controller type and the keyed switch for the second controller type. Furthermore, the third wakeup signal may be connected to the park brake release connectors for the first controller type and the throttle pedal switch for the second controller type. These input assignments minimize the logic differences between wakeup. The most common wakeup methods of turning on the first controller type key switch and the second controller type maintenance switch will work properly regardless of the vehicle type memorized by the BMS 50. As long as this wakeup happens once, the BMS 50 will continue to wakeup and sleep properly until it is transferred to another utility vehicle 20 that uses the other controller type.

When the charger is plugged into the utility vehicle 20, charging initiates regardless of whether the BMS 50 is asleep or awake. If the BMS 50 is awake, plugging in the charger asserts a charger interlock signal from the charge receptacle to the motor controller 40. The motor controller 40 may be configured to send a signal to the BMS 50 informing the BMS 50 that the charger is plugged in. For example, in some embodiments, the motor controller 40 may inform the BMS 50 that the charger is plugged in via a status bit in a message, such as a CAN message.

The BMS 50, in some embodiments, may be configured in response to the signal from the motor controller 40 to activate a charging mode. In these embodiments, the BMS 50 then sets a signal (e.g., a PWM signal) appropriately (when not charging, the BMS 50 sets the PWM signal to a fault mode as a failsafe). Charging can then take place. The BMS 50 stays awake until charging is complete, and goes to sleep shortly after charging is complete.

In some embodiments, if the charger is plugged into a utility vehicle 20 where the BMS 50 is asleep, then the charger provides power to the vehicle's electrical system. This wakes up the BMS 50 and motor controller 40. If the BMS 50 receives a communication (e.g., a CAN message) from the motor controller 40 with the charging status bit set, then it will close its contactor 106 and set the signal (e.g., the PWM signal) appropriately. Charging then commences.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event). Such modifications and enhancements are intended to belong to various embodiments of the disclosure.

What is claimed is:

1. A battery management system that controls lithium battery access on a utility vehicle, the battery management system comprising:
   a lithium battery interface configured to couple to a lithium battery;
   a power delivery interface configured to couple to a set of loads of the utility vehicle; and
   control circuitry coupled with the lithium battery interface and the power delivery interface, the control circuitry being configured to:
      mechanically disconnect the lithium battery interface from the power delivery interface in response to a sleep event,
      after the lithium battery interface is mechanically disconnected from the power delivery interface, mechanically reconnect the lithium battery interface to the power delivery interface in response to a wakeup event, and
      after the lithium battery interface is mechanically reconnected to the power delivery interface, maintain connection between the lithium battery interface and the power delivery interface to convey power from the lithium battery to the set of loads of the utility vehicle through the lithium battery interface and the power delivery interface;
   wherein the control circuitry includes:
      a contactor having source contacts configured to couple to the lithium battery interface, target contacts configured to couple to the power delivery interface, and an electromagnetic actuator, and
      a wakeup circuit coupled with the electromagnetic actuator of the contactor, the wakeup circuit being configured to (i) actuate the electromagnetic actuator to a first position that connects the source contacts to the target contacts in response to the wakeup event, and (ii) release the electromagnetic actuator to a second position that disconnects the source contacts from the target contacts in response to the sleep event, the second position being different from the first position;

wherein the wakeup circuit includes a timer which the wakeup circuit is configured to start in response to the wakeup event; and wherein the wakeup circuit is further configured to (i) output an actuation signal to the electromagnetic actuator of the contactor once the timer starts and before the timer expires and (ii) terminate output of the actuation signal to the electromagnetic actuator of the contactor in response to expiration of the timer, the electromagnetic actuator being spring biased from the first position toward the second position to separate the source contacts from the target contacts in response to the wakeup circuit terminating output of the actuation signal.

2. A battery management system as in claim 1 wherein the wakeup circuit is further configured to release the electromagnetic actuator to the second position that disconnects the source contacts from the target contacts in response to a low capacity event in which the lithium battery has discharged to a predefined low capacity level.

3. A battery management system as in claim 1 wherein the wakeup circuit is configured to couple to an ignition switch of the utility vehicle; and wherein the wakeup circuit is constructed and arranged to start the timer in response to receipt of a wakeup signal due to actuation of the ignition switch from an OFF position to an ON position.

4. A battery management system as in claim 3 wherein the wakeup circuit is further configured to couple to a foot pedal of the utility vehicle; and wherein the wakeup circuit is constructed and arranged to start the timer in response to receipt of a wakeup signal due to mechanical pressing of the foot pedal from a non-deflected position to a deflected position.

5. A battery management system as in claim 4 wherein the wakeup circuit is further configured to couple to the ignition switch and the foot pedal while the ignition switch and the foot pedal are connected in series to prevent the foot pedal from providing a wakeup signal to the wakeup circuit while the ignition switch is in the OFF position.

6. A battery management system as in claim 4 wherein the wakeup circuit is further configured to couple to a maintenance switch of the utility vehicle; and wherein the wakeup circuit is constructed and arranged to start the timer in response to receipt of a wakeup signal due to actuation of the maintenance switch from an OFF position to an ON position.

7. A battery management system as in claim 6 wherein the wakeup circuit is further configured to couple to the maintenance switch, the ignition switch, and the foot pedal while the maintenance switch, the ignition switch, and the foot pedal are connected in series to prevent the ignition switch and the foot pedal from providing a wakeup signal to the wakeup circuit while the maintenance switch is turned to the OFF position.

8. A battery management system as in claim 1 wherein the timer of the wakeup circuit is constructed and arranged to indicate that a sleep event has occurred when, after the timer is started, a predefined amount of time elapses without the timer being reset.

9. A battery management system as in claim 8 wherein the predefined amount of time is between 10 hours and 14 hours.

10. A battery management system as in claim 1 wherein the set of loads of the utility vehicle includes a motor controller and an electric motor which is coupled with the motor controller;

wherein the motor controller is configured to (i) receive stored power from the lithium battery and enters a powered state when the electromagnetic actuator actuates to the first position that connects the source contacts to the target contacts in response to the wakeup event, and (ii) no longer receive stored power from the lithium battery and transitions from the powered state to an unpowered state when the electromagnetic actuator releases to the second position that disconnects the source contacts from the target contacts in response to the sleep event; and wherein the motor controller is constructed and arranged to control delivery of stored power from the lithium battery to the motor while the motor controller is in the powered state.

11. A battery management system as in claim 10 wherein the motor controller is further constructed and arranged to control delivery of regenerative power from the motor to the lithium battery while the motor controller is in the powered state.

12. A battery management system as in claim 10 wherein the control circuitry further includes a charge regulation circuit configured to control delivery of external power from an external power source to the lithium battery to recharge the lithium battery; and wherein the wakeup circuit is constructed and arranged to adjust operation of the charge regulation circuit in response to communication with the motor controller.

13. A battery management system as in claim 12 wherein the motor controller is further constructed and arranged to provide an external power notification message to the wakeup circuit when a user connects the motor controller to an external power source; and wherein the wakeup circuitry is constructed and arranged to control operation of the charge regulation circuit in response to receipt of the external power notification message provided by the motor controller.

14. A battery management system as in claim 12 wherein the wakeup circuit is further configured to deactivate the charge regulation circuit in response to detection of a full capacity event in which the lithium battery has charged to a predefined full capacity level.

15. A utility vehicle, comprising:
a utility vehicle body;
a lithium battery supported by the utility vehicle body;
a motor supported by the utility vehicle body;
a motor controller coupled with the motor; and
a battery management system configured to control lithium battery access on the utility vehicle, the battery management system including: (i) a lithium battery interface that couples with the lithium battery, (ii) a power delivery interface that couples with the motor controller, and (iii) control circuitry coupled with the lithium battery interface and the power delivery interface, the control circuitry being constructed and arranged to:
mechanically disconnect the lithium battery interface from the power delivery interface in response to a sleep event,
after the lithium battery interface is mechanically disconnected from the power delivery interface, mechanically reconnect the lithium battery interface to the power delivery interface in response to a wakeup event, and after the lithium battery interface is mechanically reconnected to the power delivery interface, maintain connection between the lithium battery interface and the power delivery interface to convey power from the lithium battery to the motor controller through the lithium battery interface and the power delivery interface;

wherein the control circuitry of the battery management system includes:

a contactor having source contacts configured to couple to the lithium battery interface, target contacts configured to couple to the power delivery interface, and an electromagnetic actuator, and a wakeup circuit coupled with the electromagnetic actuator of the contactor, the wakeup circuit being configured to (i) actuate the electromagnetic actuator to a first position that connects the source contacts to the target contacts in response to the wakeup event, and (ii) release the electromagnetic actuator to a second position that disconnects the source contacts from the target contacts in response to the sleep event, the second position being different from the first position;

wherein the wakeup circuit includes a timer which the wakeup circuit is configured to start in response to the wakeup event; and wherein the wakeup circuit is further configured to (i) output an actuation signal to the electromagnetic actuator of the contactor once the timer starts and before the timer expires and (ii) terminate output of the actuation signal to the electromagnetic actuator of the contactor in response to expiration of the timer, the electromagnetic actuator being spring biased from the first position toward the second position to separate the source contacts from the target contacts in response to the wakeup circuit terminating output of the actuation signal.

16. A utility vehicle as in claim 15 wherein the wakeup circuit is further configured to release the electromagnetic actuator to the second position that disconnects the source contacts from the target contacts in response to a low capacity event in which the lithium battery has discharged to a predefined low capacity level.

17. In a utility vehicle, a method of controlling lithium battery access, the method comprising:

mechanically disconnecting a lithium battery interface from a power delivery interface in response to a sleep event, the lithium battery interface coupling to a lithium battery supported by the utility vehicle, and the power delivery interface coupling to a set of loads of the utility vehicle, after the lithium battery interface is mechanically disconnected from the power delivery interface, mechanically reconnecting the lithium battery interface to the power delivery interface in response to a wakeup event, and after the lithium battery interface is mechanically reconnected to the power delivery interface, maintaining connection between the lithium battery interface and the power delivery interface to convey power from the lithium battery to the set of loads of the utility vehicle through the lithium battery interface and the power delivery interface;

wherein control circuitry of the vehicle includes:

a contactor having source contacts configured to couple to the lithium battery interface, target contacts configured to couple to the power delivery interface, and an electromagnetic actuator, and a wakeup circuit coupled with the electromagnetic actuator of the contactor, the wakeup circuit being constructed and arranged to selectively output an actuation signal and terminate output of the actuation signal;

wherein mechanically reconnecting includes actuating the electromagnetic actuator to a first position that connects the source contacts to the target contacts in response to the wakeup event;

wherein mechanically disconnecting includes releasing the electromagnetic actuator to a second position that disconnects the source contacts from the target contacts in response to the sleep event, the second position being different from the first position;

wherein the wakeup circuit includes a timer;

wherein actuating the electromagnetic actuator includes:
starting the timer in response to the wakeup event, and
outputting the actuation signal to the electromagnetic actuator of the contactor once the timer starts and before the timer expires; and wherein releasing the electromagnetic actuator includes:
terminating output of the actuation signal to the electromagnetic actuator of the contactor in response to expiration of the timer, the electromagnetic actuator being spring biased from the first position toward the second position to separate the source contacts from the target contacts in response to the wakeup circuit terminating output of the actuation signal.

18. A method as in claim 17 wherein the wakeup circuit is further configured to release the electromagnetic actuator to the second position that disconnects the source contacts from the target contacts in response to a low capacity event in which the lithium battery has discharged to a predefined low capacity level.

19. A computer program product having at least one non-transitory computer readable medium, the at least one non-transitory computer readable medium having stored thereon a set of instructions to control lithium battery access on a utility vehicle; the set of instructions, when carried out by control circuitry, causing the control circuitry to perform a method of:

mechanically disconnecting a lithium battery interface from a power delivery interface in response to a sleep event, the lithium battery interface coupling to a lithium battery supported by the utility vehicle, and the power delivery interface coupling to a set of loads of the utility vehicle, after the lithium battery interface is mechanically disconnected from the power delivery interface, mechanically reconnecting the lithium battery interface to the power delivery interface in response to a wakeup event, and after the lithium battery interface is mechanically reconnected to the power delivery interface, maintaining connection between the lithium battery interface and the power delivery interface to convey power from the lithium battery to the set of loads of the utility vehicle through the lithium battery interface and the power delivery interface;

wherein control circuitry of the vehicle includes:

a contactor having source contacts configured to couple to the lithium battery interface, target contacts configured to couple to the power delivery interface, and an electromagnetic actuator, and a wakeup circuit coupled with the electromagnetic actuator of the contactor, the wakeup circuit being constructed and arranged to selectively output an actuation signal and terminate output of the actuation signal;

wherein mechanically reconnecting includes actuating the electromagnetic actuator to a first position that connects the source contacts to the target contacts in response to the wakeup event;

wherein mechanically disconnecting includes releasing the electromagnetic actuator to a second position that disconnects the source contacts from the target contacts in response to the sleep event, the second position being different from the first position;

wherein the wakeup circuit includes a timer;

wherein actuating the electromagnetic actuator includes:

starting the timer in response to the wakeup event, and outputting the actuation signal to the electromagnetic actuator of the contactor once the timer starts and before the timer expires; and wherein releasing the electromagnetic actuator includes:

terminating output of the actuation signal to the electromagnetic actuator of the contactor in response to expiration of the timer, the electromagnetic actuator being spring biased from the first position toward the second position to separate the source contacts from the target contacts in response to the wakeup circuit terminating output of the actuation signal.

20. A computer program product as in claim 19 wherein the wakeup circuit is further configured to release the electromagnetic actuator to the second position that disconnects the source contacts from the target contacts in response to a low capacity event in which the lithium battery has discharged to a predefined low capacity level.

\* \* \* \* \*